US012591874B2

(12) United States Patent
Bimolaksono et al.

(10) Patent No.: US 12,591,874 B2
(45) Date of Patent: Mar. 31, 2026

(54) METHODS AND SYSTEMS OF CENTRAL BANK DIGITAL CURRENCY FACILITATED MICROPAYMENTS

(71) Applicant: American Express Travel Related Services Company, Inc., New York, NY (US)

(72) Inventors: Lucky Bimolaksono, Hurlstone Park (AU); Matthew Stephen Bodell, New York, NY (US); Jaime A. Cruz-Herrera, Jersey City, NJ (US); Dean Ernest Arthur Nicolson, Wattle Grove (AU)

(73) Assignee: American Express Travel Related Services Company, Inc., New York, NY (US)

( * ) Notice: Subject to any disclaimer, the term of this patent is extended or adjusted under 35 U.S.C. 154(b) by 173 days.

(21) Appl. No.: 18/102,462

(22) Filed: Jan. 27, 2023

(65) Prior Publication Data

US 2024/0257092 A1      Aug. 1, 2024

(51) Int. Cl.
| | |
|---|---|
| *G06Q 20/22* | (2012.01) |
| *G06Q 20/36* | (2012.01) |

(Continued)

(52) U.S. Cl.
CPC ......... *G06Q 20/29* (2013.01); *G06Q 20/3674* (2013.01); *G06Q 20/389* (2013.01); *G06Q 20/401* (2013.01)

(58) Field of Classification Search
None
See application file for complete search history.

(56) References Cited

U.S. PATENT DOCUMENTS

| | | | | |
|---|---|---|---|---|
| 9,984,361 B2 * | 5/2018 | Englebardt | .......... | G06Q 20/227 |
| 10,943,220 B1 * | 3/2021 | Maeng | ................ | G06Q 20/204 |

(Continued)

FOREIGN PATENT DOCUMENTS

| | | | | | |
|---|---|---|---|---|---|
| WO | WO-2018137316 A1 * | 8/2018 | | ............. | G06Q 10/10 |
| WO | WO-2020014551 A1 * | 1/2020 | | ......... | G06F 16/9024 |
| WO | WO-2021195357 A1 * | 9/2021 | | ........... | G06Q 20/065 |

OTHER PUBLICATIONS

World Bank Group. "Central Bank Digital Currency." (Nov. 2021). Retrieved online Sep. 13, 2024. https://documents1.worldbank.org/curated/en/965451638867832702/pdf/Central-Bank-Digital-Currency-A-Payments-Perspective.pdf (Year : 2021).*

(Continued)

*Primary Examiner* — James A Reagan
(74) *Attorney, Agent, or Firm* — Thomas I Horstemeyer, LLP

(57) ABSTRACT

Disclosed are various embodiments of methods and systems for central bank digital currency (CBDC) facilitated micro-payments. In at least some embodiments, a system can receive an authorization request for a purchase, the authorization request can include a total transaction amount. The system can identify a payment token associated with the authorization request and obtain a plurality of payee wallet addresses. The system can then receive a transaction amount for each of the plurality of payee wallet addresses, such that a sum of the transaction amounts for the plurality of payee wallet addresses is equal to the total transaction amount. The system can then generate a CBDC transfer for each of the plurality of payee wallet addresses using a private key based at least in part on an authorization for the payment token to use a blockchain address, each CBDC blockchain transfer comprising a digital signature and transmit each of the (Continued)

CBDC blockchain transfers for the purchase to a CBDC blockchain network.

20 Claims, 5 Drawing Sheets

(51) Int. Cl.
*G06Q 20/38* (2012.01)
*G06Q 20/40* (2012.01)

(56) References Cited

U.S. PATENT DOCUMENTS

| | | | | |
|---|---|---|---|---|
| 11,315,113 | B1* | 4/2022 | Kurennykh | G06Q 20/204 |
| 11,816,651 | B1* | 11/2023 | Maeng | G06Q 20/36 |
| 11,836,690 | B1* | 12/2023 | Stroke | G06Q 20/401 |
| 12,033,120 | B1* | 7/2024 | Stroke | G06Q 20/0658 |
| 12,056,766 | B2* | 8/2024 | Ingargiola | G06F 16/2379 |
| 12,137,168 | B2* | 11/2024 | Khan | H04L 9/3236 |
| 2003/0046218 | A1* | 3/2003 | Albanese | G06Q 40/06 |
| | | | | 705/37 |
| 2003/0167204 | A1* | 9/2003 | Makipaa | G06Q 30/02 |
| | | | | 705/14.14 |
| 2012/0130853 | A1* | 5/2012 | Petri | G06Q 30/0609 |
| | | | | 705/26.35 |
| 2013/0054417 | A1* | 2/2013 | O'Donoghue | G06Q 20/02 |
| | | | | 705/26.1 |
| 2013/0226697 | A1* | 8/2013 | Englebardt | G06Q 20/227 |
| | | | | 705/14.51 |
| 2017/0232300 | A1* | 8/2017 | Tran | G06F 1/163 |
| | | | | 434/247 |
| 2017/0286951 | A1* | 10/2017 | Ignatchenko | G06Q 20/3823 |
| 2019/0147702 | A1* | 5/2019 | Malek | G07F 17/3255 |
| | | | | 463/25 |
| 2020/0320623 | A1* | 10/2020 | McGrath | G06Q 40/04 |
| 2020/0334668 | A1* | 10/2020 | Nicli | G06Q 20/367 |
| 2021/0065295 | A1* | 3/2021 | Kight | G06Q 20/065 |
| 2021/0073913 | A1* | 3/2021 | Ingargiola | G06F 16/2358 |
| 2021/0118052 | A1* | 4/2021 | Walser | G06Q 20/36 |
| 2021/0304193 | A1* | 9/2021 | Cadet | G06Q 20/4014 |
| 2022/0292496 | A1* | 9/2022 | Yan | G06Q 20/1085 |
| 2023/0047509 | A1* | 2/2023 | Dhodapkar | G06Q 20/24 |
| 2023/0116401 | A1* | 4/2023 | Nichani | G06Q 20/123 |
| | | | | 705/36 R |
| 2023/0144857 | A1* | 5/2023 | Khan | H04L 9/30 |
| | | | | 713/168 |
| 2023/0368292 | A1* | 11/2023 | Navarro | G06Q 20/065 |
| 2023/0368293 | A1* | 11/2023 | Navarro | G06Q 20/405 |
| 2024/0020692 | A1* | 1/2024 | Castagna | G06Q 20/36 |
| 2024/0078529 | A1* | 3/2024 | Maeng | G06Q 20/20 |
| 2024/0086876 | A1* | 3/2024 | Stroke | G06Q 20/3678 |
| 2024/0106651 | A1* | 3/2024 | Fortuna | G06Q 20/36 |
| 2024/0144243 | A1* | 5/2024 | Zappitell | G06Q 20/385 |
| 2024/0177144 | A1* | 5/2024 | Bieber | H04L 9/3268 |
| 2025/0023738 | A1* | 1/2025 | Khan | G06Q 20/3825 |

OTHER PUBLICATIONS

World Bank Group. "Fast Payment Systems." (Sep. 2021). Retrieved online Sep. 13, 2024. https://fastpayments.worldbank.org/sites/default/files/2021-11/Fast%20Payment%20Flagship_Final_Nov%201.pdf (Year: 2021).*

McKinsey and Company. "The 2022 Mckinsey Global Payments Report." (Oct. 2022). Retrieved online Sep. 13, 2024. https://www.mckinsey.com/~/media/mckinsey/industries/financial%20services/our%20insights/the%202022%20mckinsey%20global%20payments%20report/the-2022-mckinsey-global-payments-report.pdf (Year: 2022).*

* cited by examiner

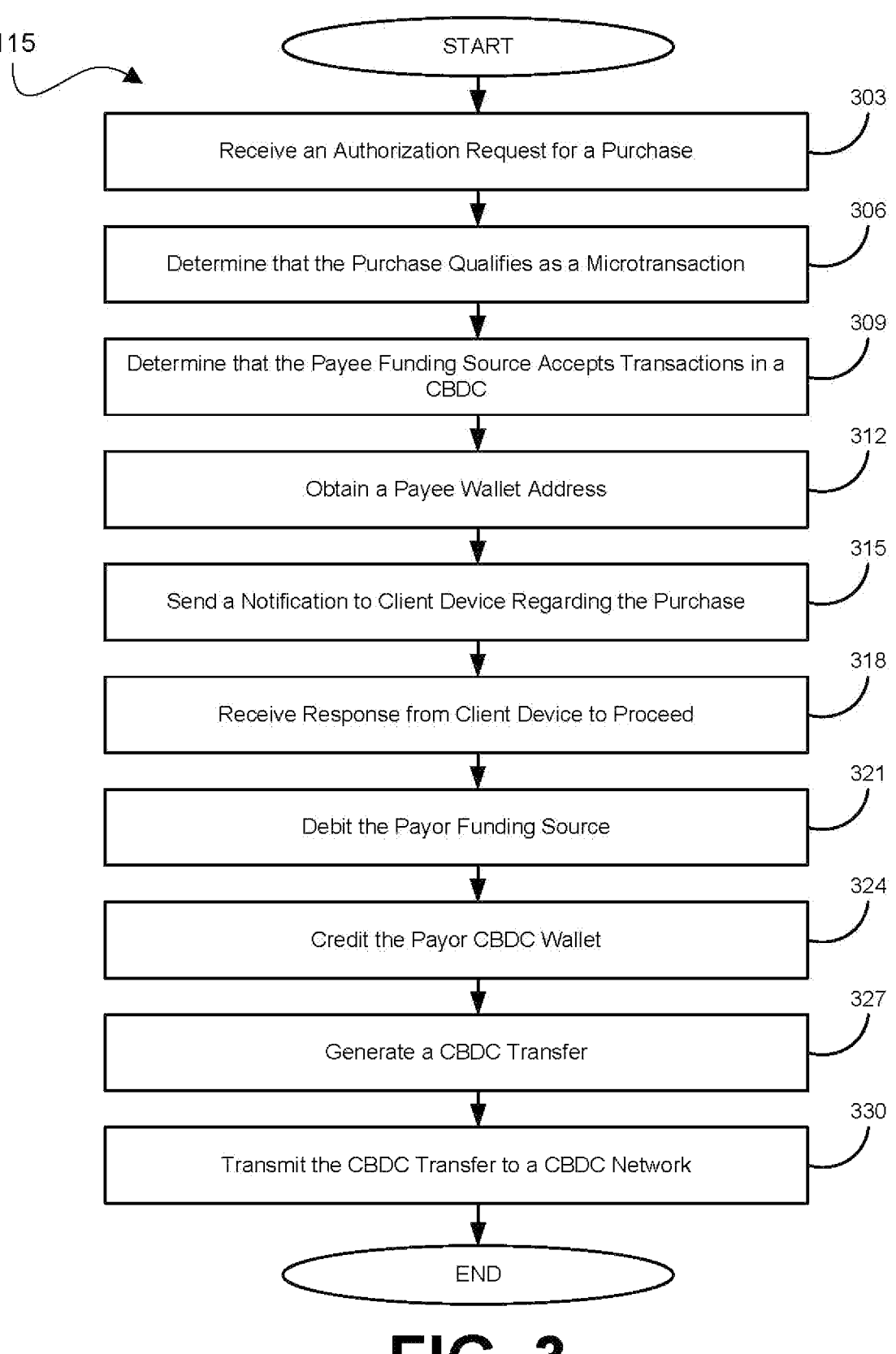

115

START

303 — Receive an Authorization Request for a Purchase

306 — Determine that the Purchase Qualifies as a Microtransaction

309 — Determine that the Payee Funding Source Accepts Transactions in a CBDC

312 — Obtain a Payee Wallet Address

315 — Send a Notification to Client Device Regarding the Purchase

318 — Receive Response from Client Device to Proceed

321 — Debit the Payor Funding Source

324 — Credit the Payor CBDC Wallet

327 — Generate a CBDC Transfer

330 — Transmit the CBDC Transfer to a CBDC Network

END

START

403 Receive a Request to Start a Transaction Session

406 Listen for Payment Events on an Event Stream

409 Identify a Payment Event

412 Debit the Payor Funding Source

415 Credit the Payor CBDC Wallet

418 Generate a CBDC Transfer

421 Transmit the CBDC Transfer to a CBDC Network

424 Received Request to Cease Listening?

No

Yes

427 Cease Listening on the Event Stream

END

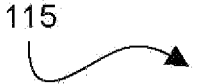
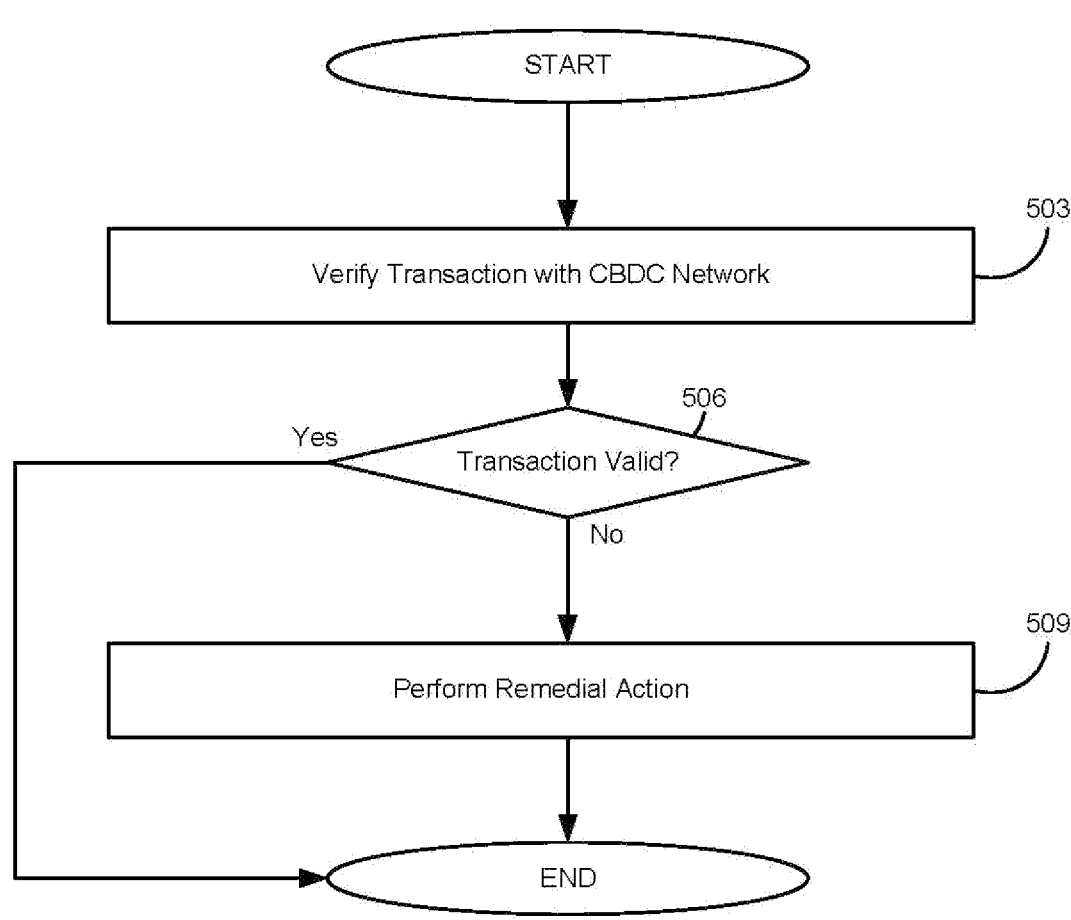
FIG. 5

METHODS AND SYSTEMS OF CENTRAL BANK DIGITAL CURRENCY FACILITATED MICROPAYMENTS

BACKGROUND

A central bank digital currency (CBDC) is a digital currency that is issued by a government entity, such as a central bank, a reserve bank, or a state monetary authority. Accordingly, the government for each country or the monetary unions for a collection of countries (e.g., the Eurozone) can have a unique CBDC for their citizens to use in their respective markets. As a result, each government or monetary union may develop a different implementation of their CBDC.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is a flowchart illustrating one example of functionality implemented as portions of an application executed in a computing environment in the network environment of FIG. 1 according to various embodiments of the present disclosure.

FIG. 5 is a flowchart illustrating one example of functionality implemented as portions of an application executed in a computing environment in the network environment of FIG. 1 according to various embodiments of the present disclosure.

DETAILED DESCRIPTION

Figure 1:
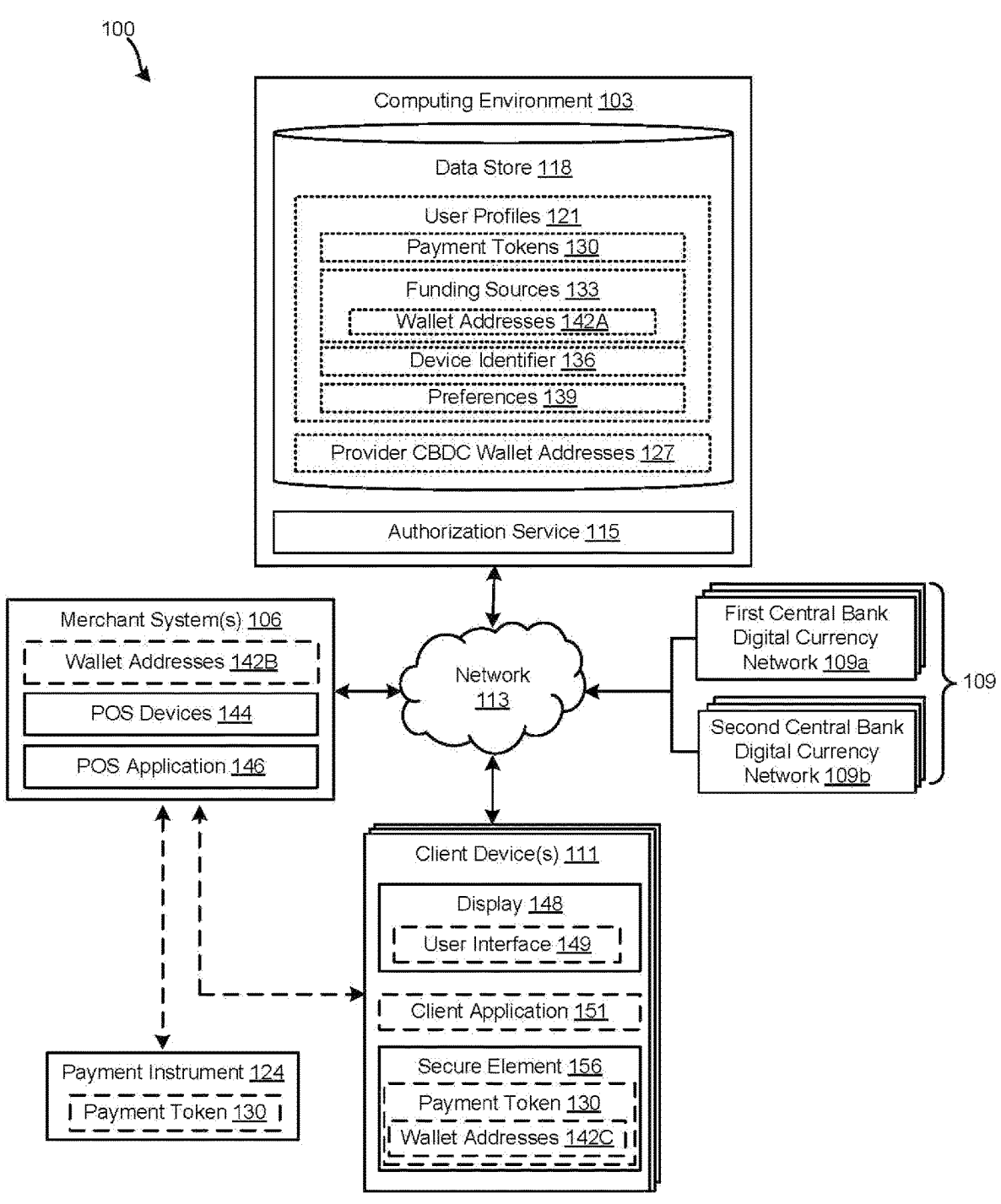
FIG. 1 is a drawing of a network environment according to various embodiments of the present disclosure.

Disclosed are various approaches of methods and systems for central bank digital currency (CBDC) facilitated micropayments. As CBDCs are developed by government entities or monetary unions, financial service providers will need mechanisms for integrating CBDCs into payment processing rails that allow for payments to made in a particular CBDC or another digital currency. A payment processing rail can refer to a technology platform or a payment network that moves money from a payor to a payee. Some non-limiting examples of a payment processing rail can include payment card rails (e.g., credit and debit cards), automated clearing houses, real-time gross settlement (RTGS) systems, and proprietary payment services such as PayPal®, Venmo®, Zelle®, and many others. Further, the payment processing rails for each country can involve different currencies.

Payment processing rails often charge a portion of the total transaction amount as fees to process a transaction. Certain types of transactions, like micropayment transactions, are especially affected by these fees. For instance, a bank can charge a fixed cost of six cents per transaction to process the payment. On a transaction that is one-hundred dollars, the six-cent transaction fee is less than one tenth of one percent of the total cost. However, on a micropayment transaction like a one-dollar transaction, six cents represents six percent of the total cost. For certain industries, these fees can be cost prohibitive. In some embodiments, a micropayment transaction can represent a payment lower than the lowest standard denomination for a specified currency (e.g., less than one penny for United States Dollars). In such embodiments, the fees are often greater than the value of the payment being made.

In at least one embodiment, a payor may want to make consecutive micropayments over a period of time. Consecutive micropayments could be used for a pay-per-use internet of things (IoT) device. For example, an automobile may be configured to initiate a transaction for each mile or each hour a person is operating a vehicle. In another example, a person may be watching a live stream of their favorite gaming personality play a video game. In such a situation, the person may want to make multiple small tips or donations to the live streamer when the live streamer performs well. In another example, a person may be downloading applications from an app store where the cost of each application is minimal, but the person is likely to purchase more than just one application. In each of these types of transactions, the fees that would be charged are substantially greater than if the transactions were processed as a single, bulk transaction.

Embodiments of the present disclosure are directed to making micropayment transactions less prohibitive using CBDCs to facilitate the transactions. CBDCs are intended to act a digital replacement for a country's currency. Accordingly, CBDCs are less likely to charge transaction processing fees, unlike other payment processing rails, because such fees would be viewed as another tax on its people just to use the CBDC as currency. In addition, a CBDC can be backed by an issuing government entity and/or monetary union, which can make CBDCs a less risky asset. When CBDCs are issued by a central bank or centralized financial body, many counterparty default risks that are present in other solutions are removed.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a network environment 100 according to various embodiments. The network environment 100 can include a computing environment 103, a merchant system 106, a first CBDC network 109a, a second CBDC network 109b, and a client device 111, which can be in data communication with each other via a network 113. The first CBDC network 109a and the second CBDC network 109b can be referred to collectively as CBDC networks 109 or a CBDC network 109.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, near-field communication (NFC) networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include the authorization service 115, and other applications, services, processes, systems, engines, or functionality not discussed in detail herein. The authorization service 115 can be executed to facilitate transfer of funds from a funding source to a digital wallet. Additionally, the authorization service 115 can be executed to facilitate the payment processing of the digital currency at CBDC networks 109 for transactions with merchant systems 106. Further explanation of processes performed by the authorization service 115 are depicted in the description of FIGS. 2-5.

Also, various data is stored in a data store 118 that is accessible to the computing environment 103. The data store 118 can be representative of a plurality of data stores 118, which can include relational databases or non-relational databases, such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 118 is associated with the operation of the various applications or functional entities described below. This data can include user profiles 121, provider CBDC wallet addresses 127, and potentially other data.

A user profile 121 can represent a profile or an account of a user or merchant at the computing environment 103. In some examples, the computing environment 103 can be managed by an entity (e.g., a financial service provider) that provides services to various users and/or merchants. The user profile 121 can include payment tokens 130, funding sources 133, device identifiers 136, preferences 139, and other suitable data.

The payment token 130 can represent a payment credential or an alias for a financial account of the user. The payment token 130 can be stored in a client device 111, a payment instrument 124 (e.g., a payment card), or other suitable payment mechanisms. In some non-limiting examples, the client device 111 can be a smart phone device, a tablet device, a wearable device (e.g., a smart watch, smart glasses, an activity tracking device, etc.), or other suitable client devices 111.

The funding sources 133 can represent one or more financial accounts that are managed by or associated with the user. The funding sources 133 can include client wallet addresses 142A (e.g., CBDC wallets for one or more CBDC networks 109, etc.), credit card accounts, debit accounts, loyalty point accounts, a line of credit, or other suitable financial accounts. In some examples, one or more funding sources 133 can be configured to be automatically assigned to certain transactions. For example, a particular CBDC wallet can be assigned as a funding source for a payment instrument 124 when used at a POS device 144, as illustrated in FIG. 1. In some examples, the funding sources 133 can include data associated with one or more client wallet addresses 142A.

The device identifier 136 can represent a unique identifier for the client device 111 of the user. The device identifier 136 can be a phone number, a manufacturer serial number, a unique device identifier associated with an operating system executed on the client device 111, an International Mobile Equipment Identity (IMEI) number, and other suitable unique identifiers. In some embodiments, the device identifier 136 can be linked to one or more payment tokens 130. Thus, during a transaction at a POS device 144, the computing environment 103 can transmit a request for confirmation or authorization of a funding source 133 for individual transactions.

The preferences 139 can represent settings for facilitating the selection of funding sources 133 for the client device 111. For example, the preferences 139 can indicate a selected assignment of a particular funding source 133 for a payment token 130. In some examples, the preferences 139 can include rules for determining the appropriate funding source(s) 133 for a particular transaction. For instance, a transaction can be assigned a first wallet address 142C based at least in part on an amount of the transaction being less than a monetary amount (e.g., less than $100). In another example, a second wallet address 142C can be assigned based at least in part on the transaction type, such as an online transaction. Thus, the transaction type can be used to determine the funding source 133, along with various other data stored in the preferences 139.

In at least one embodiment, the preferences 139 can include additional data that is used to determine a funding source 133. For instance, a funding source 133 can be identified based on at least one of the location of the merchant, a type of the merchant, a time of day, a known balance of the funding source 133, or other various information. For instance, a user may have determined a preference 139 for international transactions to be charged to a first funding source 133 and domestic transactions be charged to a second funding source 133. In another instance, the type of merchant could be used to identify a funding source. To this end, a user can wish to fund a specific amount on a funding source, and when such funds run out for that merchant, the user will be unable to use that payment type again. This could be used in an embodiment for microtransactions in video games, and the type of merchant (e.g., gaming type merchant) can have limits to the usage of funds on a funding source 133. Additionally, the time of day can be used. An example of using time of day to determine a funding source can include when a preference will permit a transaction during business hours as a job perk, but disallow such transaction during non-working hours. In such an embodiment, the preference 139 can indicate that a first funding source 133 is used during the day and a second funding source 133 is used during the evening. Additionally, the known amount of funds can be used to determine the funding source 133. For instance, a user may have a preference 139 that a certain amount of funds remain in an account. In such an instance, when the funds requested would deplete the account below the threshold, the primary funding source 133 could be diverted to a secondary funding source 133. resurrect Additionally, the preferences 139 can include settings for facilitating the selection of funding sources 133 or wallet addresses 142A for which payments are made. In at least one embodiment, a merchant account can have preferences 139 that indicate that at least a portion of the payments made for a particular item, product, good, or service should be split among one or more funding sources 133 and that the transaction should be split among one or more wallet addresses 142. In at least another embodiment, the preferences 139 can include an indication to send at least a portion of the transaction amount to a wallet address 142 that is not one of the merchant's funding sources 133, but instead a third-party funding source. This allows a merchant to split transactions into microtransactions and automatically provide funding to their vendors or stakeholders in the supply chain.

The provider CBDC wallet address 127 can be used for performing digital currency transactions at the CBDC network 109 on behalf of a financial service provider or on behalf of users who do not have a wallet address 142A. The provider CBDC wallet address 127 can be associated with public and private keys, or other forms of authorization and authentication. In some scenarios, the computing environment 103 can have a provider CBDC wallet address 127 for each different CBDC type. For example, a first provider CBDC wallet address 127 can be used for a United States CBDC network 109 and a second provider CBDC wallet address 127 can be used for a European Union CBDC network 109.

The client device 111 is representative of a plurality of client devices that can be coupled to the network 113. The client device 111 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), a media playback device (e.g., media streaming devices, BluRay® players, digital video disc (DVD) players, set-top boxes, and similar devices), a videogame console, a wearable device (e.g., smart watches, smart glasses, activity tracking devices, etc.), or other devices with like capability. In at least some embodiments, a client device 111 can also be embodied in the form of an internet of things (IoT) device, such as an internet-enabled device, like an automobile, a refrigerator, a thermostat, a light switch, or any other device connected to the internet. The client device 111 can include one or more displays 148, such as liquid crystal displays (LCDs), gas plasma-based flat panel displays, organic light emitting diode (OLED) displays, electrophoretic ink ("E-ink") displays, projectors, or other types of display devices. In some instances, the display 148 can be a component of the client device 111 or can be connected to the client device 111 through a wired or wireless connection.

The client device 111 can include a memory for storing application data. In some embodiments, the client device 111 can include a secure element 156. The secure element 156 can be implemented as a hardware component, as a software component, or a combination of hardware and software. The secure element 156 can store confidential payment information, identity credentials, cryptographic data, and/or potentially other confidential data. In some embodiments, the secure element 156 can include a computing device that is tamper resistant, in which the computing device includes a processor and memory. In some instances, the hardware and/or software components used to implement a secure element can be certified by a security standards body, such as GlobalPlatform®.

The client device 111 can be configured to execute various applications such as a client application 151 or other applications. The client application 151 can be executed to perform wallet functionality for executing CBDC transactions, storing and accessing payment tokens 130 in memory of the client device 111, and other payment related functions. The client application 151 can also be used to provide payment data to the POS device 144. In some examples, the client application 151 can be used to sign (e.g., generate digital signatures) transaction transfers with a private key associated with the wallet address 142C.

Additionally, the client application 151 can be executed in a client device 111 to access network content served up by the computing environment 103 or other servers, thereby rendering a user interface 149 on the display 148. To this end, the client application 151 can include a browser, a dedicated application, or other executable, and the user interface 149 can include a network page, an application screen, or other user mechanism for obtaining user input. The client device 111 can be configured to execute applications beyond the client application 151 such as email applications, social networking applications, word processors, spreadsheets, or other applications.

The merchant system 106 can represent a merchant network environment for conducting point of sale transactions in person at a physical store location or online. The merchant system 106 can include the POS device 144 for in-person and online transactions. In at least some embodiments, the POS device 144 can include various detectors, such as a camera, a light spectrum scanner, a motion detector, a microphone, radio frequency (RF) detectors, or other type of detectors. Such detectors could be used to recognize payment instruments 124. In some embodiments, the detectors of a POS device 144 can detect a payment instrument over NFC radio frequencies. In another embodiment, a POS device 144 can detect a QR code being presented using a visual detector, such a camera, a visual spectrum scanner, or other detector.

The merchant system 106 can include a wallet address 142B for interacting with the CBDC network 109. The wallet address 142B can include a wallet address associated with the merchant system 106. The wallet address 142B can be used to derive a public key (or other authentication and authorization credentials), which can be used for transmitting digital currency for transaction proceeds to the wallet address of the wallet address 142B at the CBDC network 109 (e.g., via a CBDC blockchain). The transfer of these transaction proceeds can be part of a settlement process. In at least some embodiments, such a transfer can occur simultaneously with the authorization of the transaction. In at least another embodiment, such a transfer can occur sequentially with the authorization of the transaction. The merchant system 106 can include a POS application 146 that is executed to interface with one or more the POS devices 144, the authorization service 115, the CBDC Network 109, and other components in the network environment 100.

The CBDC network 109 can present an implementation of a CBDC that is backed by one or more government entities. In some examples, the CBDC network 109 is implemented as a database that maintains records of transactions. For instance, the CBDC network 109 can be implemented as a blockchain network. In some example implementations, the CBDC network 109 can include a public blockchain, a private blockchain, a combination of private and public blockchain components, or other suitable arrangements. Each territory, country, nation, or payment area (e.g., Single Euro Payments Area) may have a different CBDC network 109 with a different implementation.

In some examples, the CBDC network 109 can be an account-based CBDC, a token-based CBDC, or other suitable CBDC implementations. In an account-based CBDC, the originator (e.g., the sending user) and beneficiary (e.g., the recipient user) of a transaction approve a transaction on the basis of user identities. In this non-limiting example, the transactions in account-based CBDC architecture can have direct attributes to identity-based accounts. In a token-based example, the originator (e.g., the sending user) and beneficiary (e.g., the recipient user) can use digital signatures and public-private key pairs for approving transactions that are submitted to the CBDC network 109. In at least another embodiment, the originator (e.g., the sending user) can send funds to the beneficiary (e.g., the recipient user) without the beneficiary's involvement when a publicly available address is provided for the beneficiary.

The payment instrument 124 can represent a payment card or a device that stores payment information (e.g., a payment token 130). The payment instrument 124 can provide the payment token 130 to a POS device 144 for a purchase. In some examples, the client device 111 can operate as a payment instrument 124 (e.g., EMV contactless payments).

Next, a general description of the operation of the various components of the network environment 100 is provided. In at least one non-limiting embodiment, a payor, the person making a payment, can make a purchase and that purchase can be split into a plurality of microtransactions to one or more payees, those who receive the payment. In such a non-limiting embodiment, a client application 151 or a merchant system 106 can send an authorization request to the authorization service 115 to authorize a purchase. The authorization service 115 can identify a payment token(s) 130 associated with the authorization request. The authorization service 115 can then obtain payee wallet addresses 142. The authorization service 115 can receive a transaction amount corresponding to each payee wallet address 142. The authorization service 115 can then generate a CBDC transfer for each of the payee wallet addresses 142. The authorization service 115 can then transmit each of the CBDC transfers to a CBDC network 109. The CBDC network 109 can track the exchange on its ledger. Additional details related to the operation of this embodiment is further explained in the description of FIG. 2.

In another non-limiting embodiment, a payor can attempt to make a payment to a payee, but it may be less economically efficient to make such transaction over traditional payment rails due to various fees. In such an embodiment, a CBDC, which may have little to no fees for the exchange of its digital currency can be used in lieu of traditional payment means. A client application 151 can send an authorization request to the authorization service 115 for a purchase. The authorization service 115 can determine that the purchase qualifies as a microtransaction. Next, the authorization service 115 can determine that the payee funding source accepts transactions in a CBDC denomination and obtain a payee wallet address 142. The authorization service 115 can then send a notification to the client application 151 to alert the client that a transaction will occur. The client application 151 can send a response indicating to the authorization service 115 that the transaction can proceed. The authorization service 115 can then debit the payor funding source 133 corresponding to the client device 111 or the device identifier 136. The authorization service 115 can then credit the payor CBDC wallet address 142 with CBDC denominations equivalent to the total transaction amount. The authorization service 115 can then generate a CBDC transfer for each of the payee wallet addresses 142. The authorization service 115 can then transmit each of the CBDC transfers to a CBDC network 109. The CBDC network 109 can track the exchange on its ledger. Additional details related to the operation of this embodiment is further explained in the description of FIG. 3.

In at least another embodiment, a payor may want to make consecutive micropayments over a period of time. Consecutive micropayments could be used for a pay-per-use IoT device. For example, an automobile may be configured to initiate a transaction for each mile or each hour a person is operating a vehicle. In another example, a person may be watching a live stream of their favorite gaming personality play a video game. In such a situation, the person may want to make multiple small tips or donations to the live streamer when the live streamer performs well. In another situation, a person may be downloading applications from an app store where the cost of each application is minimal, but the person is likely to purchase more than just one application. In yet another situation, a video game may use a stream of microtransactions for various actions (e.g., microtransaction for each bullet fired, upgrade purchased, respawn/extra-life, etc.).

In such an embodiment, the client application 151 can send a request to start a transaction session to the authorization service 115. The authorization service 115 the listens for payment events on an event stream that connects the client device 111 to the computing environment 103 over the network 113. The authorization service 115 can identify a payment event when it occurs. They payment event can include a price, a brief description, and other information for the transaction. The authorization service 115 can then debit the payor funding source 133 corresponding to the client device 111 or the device identifier 136. The authorization service 115 can then credit the payor CBDC wallet address 142 with CBDC denominations equivalent to total transaction amount. The authorization service 115 can then generate a CBDC transfer for each of the payee wallet addresses 142. The authorization service 115 can then transmit each of the CBDC transfers to a CBDC network 109. The CBDC network 109 can track the exchange on its ledger. The authorization service 115 can then determine if it has received a request to cease listening to the event stream. If the authorization service 115 has not, the authorization service 115 can continue listening for payment events on the event stream. If the authorization service 115 has received a request to cease listening on the event stream. Additional details related to the operation of this embodiment is further explained in the description of FIG. 4.

Figure 2:
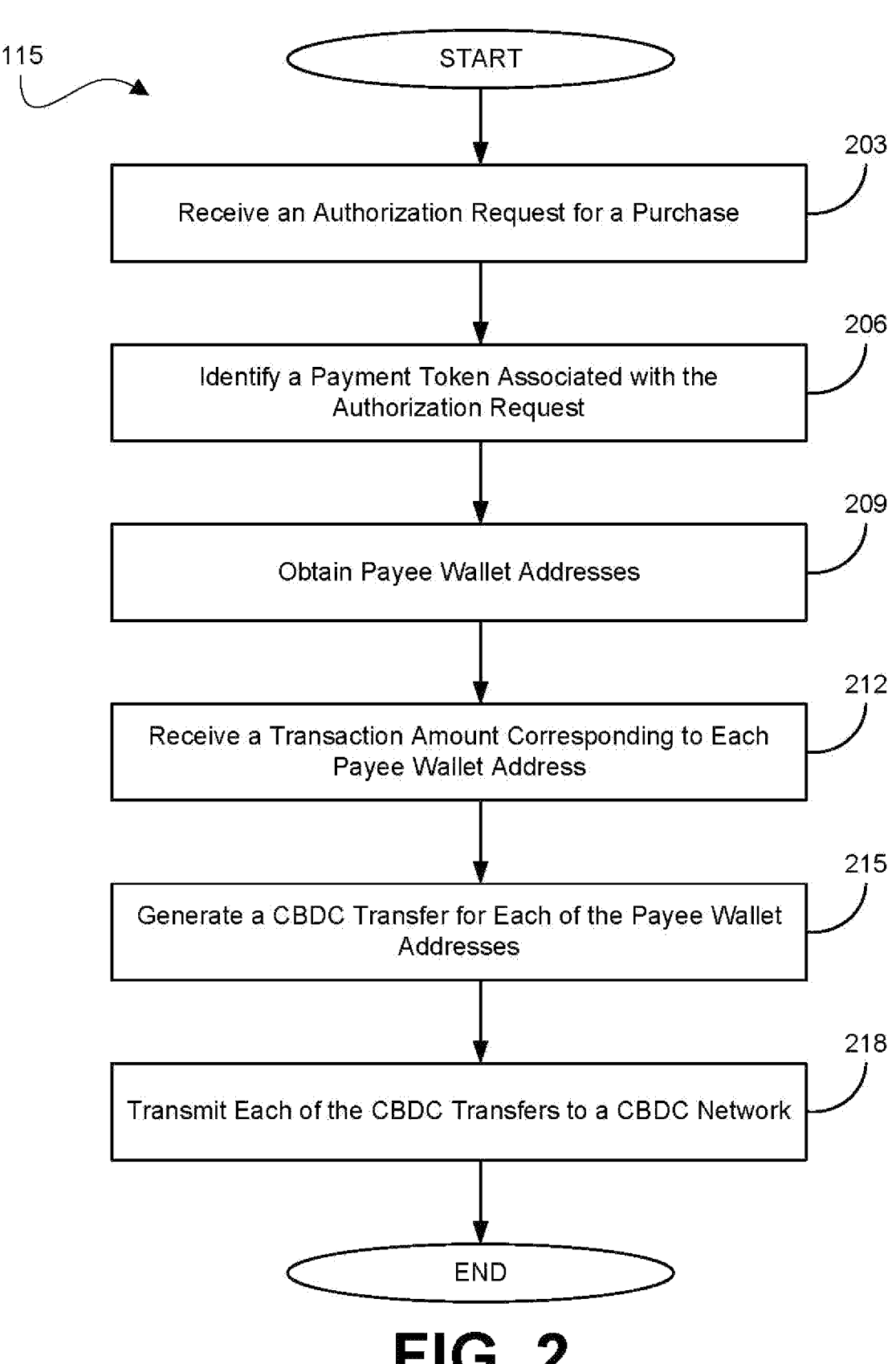
FIG. 2 is a flowchart illustrating one example of functionality implemented as portions of an application executed in a computing environment in the network environment of FIG. 1 according to various embodiments of the present disclosure.
Figure 4:
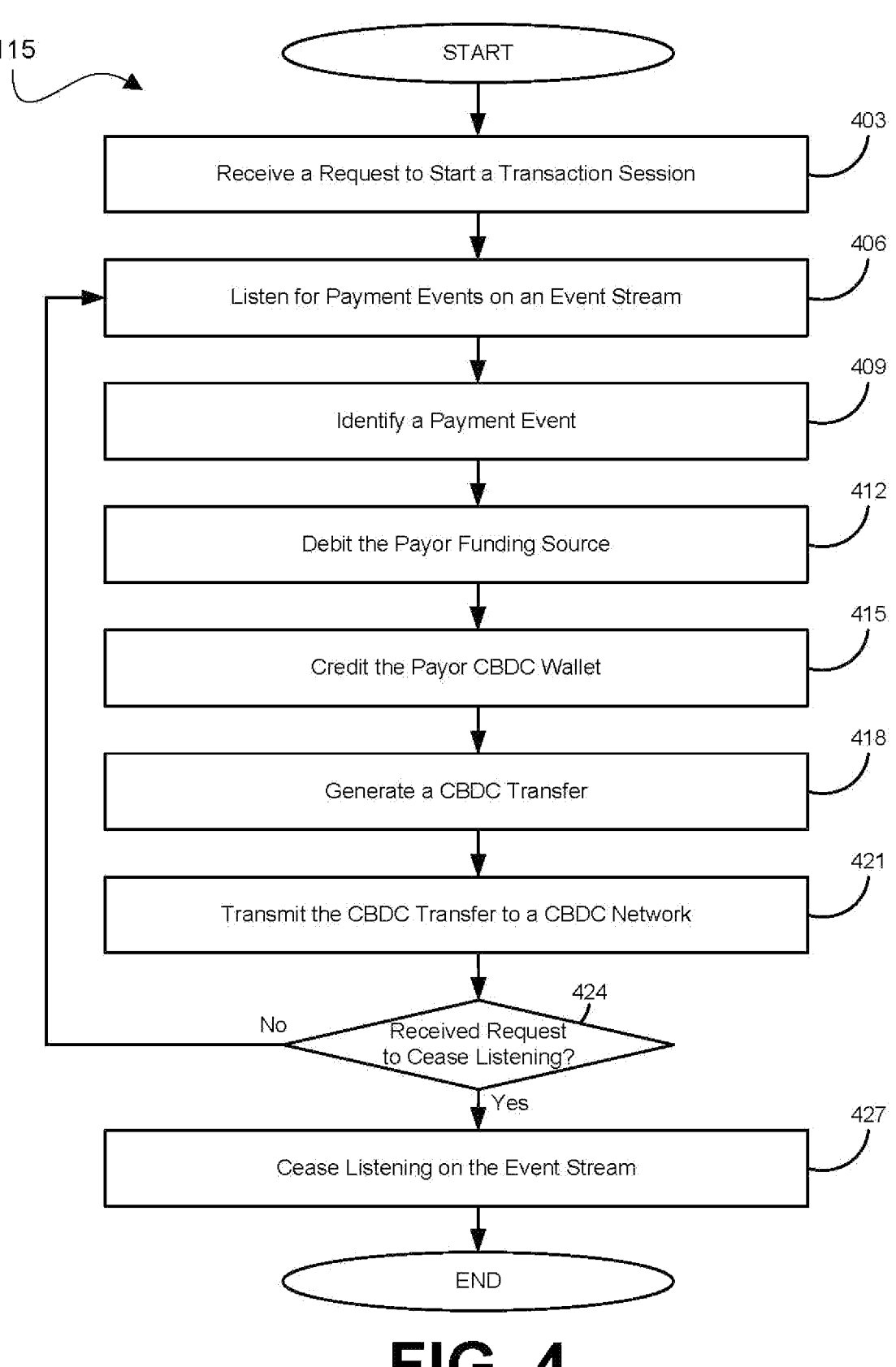
FIG. 4 is a flowchart illustrating one example of functionality implemented as portions of an application executed in a computing environment in the network environment of FIG. 1 according to various embodiments of the present disclosure.

Additionally, embodiments described in FIGS. 2-4 can also verify that a transaction has been completed with a CBDC network 109. If the transaction has been completed on the CBDC network 109, then the process can end. However, if the transaction has failed for any reason, the authorization service 115 can perform a remedial action. Additional details related to the operation of such embodiments can further be explained in the description of FIG. 5.

Referring next to FIG. 2, shown is a flowchart that provides one example of the operation of a portion of the authorization service 115. The flowchart of FIG. 2 provides merely an example of the many different types of functional arrangements that can be employed to implement the operation of the depicted portion of the authorization service 115. As an alternative, the flowchart of FIG. 2 can be viewed as depicting an example of elements of a method implemented within the network environment 100.

Beginning with block 203, the authorization service 115 can receive an authorization request for a purchase. The authorization request can include information related to the payor, such as a device identifier 136, a payment token 130, a payor wallet address 142, or other information. The authorization request can also include a total transaction amount for the purchase and other information related to the transaction. In at least one embodiment, the authorization request can include information related to a good that is being purchased, such as a stock keeping unit (SKU) or other unique product identifier. In at least another embodiment, the authorization request can include information related to a service that is being purchased, such that the service can be uniquely identified.

Next, at block 206, the authorization service 115 can identify a payment token 130 associated with the authorization request. In at least one embodiment, the payment token 130 can be included in the authorization request that was received at block 203. In at least another embodiment, other information, such as a wallet address 142 or a device identifier 136, can be received with the authorization request of block 203. In such an embodiment, a device identifier 136 of a wallet address can be used to identify a specific user profile 121 and ultimately a payment token 130 or a funding source 133.

Next, at block 209, the authorization service 115 can obtain a plurality of payee wallet addresses 142. In at least one embodiment, the authorization service 115 can request the plurality of payee wallet addresses 142 from the POS application 146 or another application within the network environment 100. In such an embodiment, the authorization service 115 can send a product identifier or a SKU that was received during the authorization request along with the request to receive wallet addresses specific to processing a certain product. In at least some embodiments, the payee wallet addresses 142 are stored in the data store 118 for a merchant. In at least some embodiments, the payee wallet addresses 142 can belong to or be associated with one or more of a merchant, a user, supply chain stakeholder, a government entity, or any other legal entity. In at least one embodiment where a government entity belongs or is associated with a payee wallet address 142, at least a portion of payment may represent a payment of a tax, such as a sales tax, a usage tax, or a carbon tax to the government entity.

Next, at block 212, the authorization service 115 can receive a transaction amount for each of the plurality of payee wallet addresses. In many embodiments, the sum of each transaction amount is equal to the total transaction amount. However, in some embodiments, the amount for each of the plurality of payee wallet addresses is stored as a percentage of a total transaction, so the authorization service 115 can calculate each of the transaction amounts corresponding to each payee wallet address by multiplying the stored percentage with the total transaction amount. In some embodiments, the decimal precision of the percentage of the total transaction can be important to ensuring that amounts are calculated correctly for each transaction.

As previously stated, the payee wallet addresses 142 can belong to or be associated with one or more of a merchant, a user, supply chain stakeholder, a government entity, or any other legal entity. In one such embodiment, the plurality of payee wallet addresses can correspond to a plurality of supply stakeholders that contributed to a supply chain of the good or service. For instance, a cup of coffee may have been grown by a farmer, shipped by a shipper, ground, and roasted by a coffee roaster, and brewed by a barista; each of these professions represents a supply stakeholder in a simplified example of a coffee supply chain. In the embodiment where the plurality of payee wallet addresses correspond to a plurality of supply stakeholders that contributed to a supply chain of the good or service, each transaction amount can correspond to an amount allocated for such supply stakeholder. Using the example above, a merchant can allocate a first percentage of the sales to the farmer, a second percentage of the sales to the shipper, a third percentage of the sales to the coffee roaster, and a fourth percentage of the sales to the barista. Each of these percentages is then multiplied by the total transaction amount of the good to obtain the amount in a specified currency for each of the transactions, respectively. In some embodiments, the amount may need to convert to a CBDC amount, which would be the equivalent to the non-CBDC amount according to an exchange rate.

Next, at block 215, the authorization service 115 can generate a CBDC transfer for each of the plurality of payee wallet addresses. In some embodiments, a CBDC transfer can represent a line that could be added to a ledger in a larger system, such as a CBDC network 109. Because CBDCs can be implemented on a blockchain or a distributed data store, in at least some embodiments the CBDC transfer can be a CBDC blockchain transfer, which ensures that the CBDC transfer is formatted according to a specified blockchain standard. In some embodiments, the authorization service 115 can use a private key based at least in part on an authorization for the payment token 130 to use as a blockchain address. In some embodiments, a CBDC transfer can comprise a digital signature.

Next, at block 218, the authorization service 115 can transmit each of the CBDC transfers for the purchase to a CBDC network 109. In at least one embodiment, transmitting a CBDC transfer can include sending a request to service hosted on a CBDC network 109. In an embodiment where the CBDC transfer is a CBDC blockchain transfer, the CBDC blockchain transfer can be written to the blockchain or distributed datastore of the CBDC network 109. Once the authorization service 115 has transmitted each of the CBDC transfers for the purchase, the flowchart of FIG. 2 ends. In at least another embodiment, once the authorization service 115 has transmitted each of the CBDC transfers for the purchase, the flowchart of FIG. 2 continues to block 503 of FIG. 5.

Referring next to FIG. 3, shown is a flowchart that provides one example of the operation of a portion of the authorization service 115. The flowchart of FIG. 3 provides merely an example of the many different types of functional arrangements that can be employed to implement the operation of the depicted portion of the authorization service 115. As an alternative, the flowchart of FIG. 3 can be viewed as depicting an example of elements of a method implemented within the network environment 100.

Beginning with block 303, the authorization service 115 can receive an authorization request for a purchase from at least one of the client application 151 or the POS application 146. The authorization request can include a total transaction amount, a specified funding source 133 from which the authorization will debit (a payor funding source), and/or a specified funding source 133 (a payee funding source) or payment token 130 for recipient of the payment. In at least some embodiments, both the payor funding source 133 and payee funding source 133 are funded with non-digital currency. In this sense, a payor is attempting to complete a transaction to a payee using non-digital currency. In at least one embodiment, the authorization request can include information related to a good that is being purchased, such as a stock keeping unit (SKU) or other unique product identifier. In at least another embodiment, the authorization request can include information related to a service that is being purchased, such that the service can be uniquely identified.

Next, at block 306, the authorization service 115 can determine that the purchase qualifies as a microtransaction. In at least one embodiment, the authorization service 115 can determine that the purchase qualifies as a microtransaction by at least comparing the total transaction amount to a threshold amount. For example, the authorization service 115 may consider a transaction a microtransaction when its transaction amount is less than twenty dollars USD. The transaction threshold can be included as a portion of the authorization service 115 or stored as a user's preference 139. In at least another embodiment, the authorization service 115 can use other factors for determining that a purchase qualifies as a microtransaction. Other factors can include an analysis of the transaction system's efficiency or other determinants stored in the system. The analysis of the transaction system's efficiency can identify that whether making such transactions are cost optimal for the payor, the payee, and/or the computing environment 103 as a whole.

Next, at block 309, the authorization service 115 can determine whether the payee funding source accepts transactions in CBDC denominations. In at least some embodiments, the authorization service 115 can inspect user preferences 139 for the payee user profile 121 to determine whether accepting transactions in CBDC denominations is acceptable. In at least one embodiment, the authorization service 115 can determine whether the payee funding source 133 accepts transactions in a CBDC denomination by at least sending a payment inquiry request to a payee funding source issuer for acceptable payment types. The authorization service 115 can then receive a response to the payment inquiry request indicating that the CBDC is an acceptable payment type. In at least another example, the authorization service 115 can determine whether the payee has a wallet address 142 that corresponds to a specified CBDC network 109.

Next, at block 312, the authorization service 115 can obtain a payee wallet address 142. To transfer funds over a CBDC network 109, the payee must have a wallet address 142 to accept the payment. In at least one embodiment, the authorization service 115 can obtain the payee wallet address 142 from the authorization request received in block 303. In at least another embodiment, the authorization service 115 can search for a user profile 121 that corresponds to the payee. In at least another embodiment, the authorization service 115 can send a request to a merchant system 106 for the wallet address 142 stored on the merchant system 106. In yet another embodiment, the authorization service 115 can send a request to a client application 151 for the wallet address 142 stored on the client device 111. In yet another embodiment, the authorization service 115 can send a request to an addressing service or lookup service of the CBDC network 109 to find the wallet address 142 corresponding to the payee.

Next, at block 315, the authorization service 115 can send a notification to the client application 151 on the client device 111 to inform the client about the purchase. As a security measure, before any funds are debited from the payor's funding source 133, the authorization service 115 can send a notification to the client application 151 to notify the client about the upcoming transaction. This allows the client to verify that the transaction is correct before it has completed and this provides an extra security layer to prevent fraud. The notification can include details about the transaction to allow the client to determine whether the transaction is valid. Transaction details can include a transaction amount, payee information, and other information related to the transaction. The notification can include a way in which the client can provide a response, such as buttons, links, or other UI elements. In at least some embodiments, the notification includes instructions to display a button that, when pushed, sends a response to the authorization service 115 that indicates that the client has approved the transaction. In some embodiments, the notification can be sent to another registered device other than the client device 111 to inform the client about the purchase. Such an embodiment can be used as a method to prevent fraudulent access to the client device 111. At block 318, the authorization service 115 can receive such a response from the client application 151 on the client device 111 indicating that the transaction is approved to proceed.

Next, at block 321, the authorization service 115 can debit the payor funding source 133, thereby causing an amount of a currency denomination to be taken from the payor funding source 133. For example, if the payor funding source 133 is funded with US dollars and the transaction amount is in US dollars, the transaction amount in US dollars will be deducted from the payor funding source 133. In many embodiments, the authorization service 115 can debit the payor funding source 133 by the total transaction amount. In some embodiments, the authorization service 115 can look up an exchange rate between the currency denomination of the transaction and the currency denomination of the payor funding source 133. Such an exchange rate can be used to calculate the amount to be debited from the payor funding source 133. In some embodiments, the authorization service 115 will debit the payor funding source 133 in response to receiving the response from the client application 151 indicating that the transaction is approved to proceed, as described in block 318. In some embodiments, the authorization service 115 will debit the payor funding source 133 in response to transmitting the CBDC transfer to a CBDC network 109, as later described in block 330.

Next, at block 324, the authorization service 115 can credit the payor CBDC wallet, thereby causing an amount of a currency denomination to be added to the payor CBDC wallet. A CBDC wallet can be a funding source 133 for a user profile 121. In many embodiments, the amount added to the payor CBDC wallet will correspond to the total transaction amount. In some embodiments, the authorization service 115 can look up an exchange rate between the currency denomination of the total transaction amount and the CBDC. Such an exchange rate can be used to calculate the amount to be credited to the payor CBDC wallet. In at least one embodiment, a user profile 121 for the payor may not have a funding source 133 that can be a payor CBDC wallet. In such a situation, the provider of the authorization service 115 can utilize a provider CBDC wallet address 127 in lieu of a payor CBDC wallet 142.

Next, at block 327, the authorization service 115 the authorization service 115 can generate a CBDC transfer corresponding to the payee wallet address. In some embodiments, a CBDC transfer can represent a line that could be added to a ledger in a larger system, such as a CBDC network 109. Because CBDCs can be implemented on a blockchain or a distributed data store, in at least some embodiments the CBDC transfer can be a CBDC blockchain transfer, which ensures that the CBDC transfer is formatted according to a specified blockchain standard. In some embodiments, the authorization service 115 can use a private key based at least in part on an authorization for the payment token 130 to use as a blockchain address. In some embodiments, a CBDC transfer can comprise a digital signature.

Next, at block 330, the authorization service 115 can transmit the CBDC transfer for the purchase to a CBDC network 109. In at least one embodiment, transmitting a CBDC transfer can include sending a request to service hosted on a CBDC network 109. In an embodiment where the CBDC transfer is a CBDC blockchain transfer, the CBDC blockchain transfer can be written to the blockchain or distributed datastore of the CBDC network 109. Once the authorization service 115 has transmitted each of the CBDC transfers for the purchase, the flowchart of FIG. 3 ends. In at least another embodiment, once the authorization service 115 has transmitted each of the CBDC transfers for the purchase, the flowchart of FIG. 2 continues to block 503 of FIG. 5.

Referring next to FIG. 4, shown is a flowchart that provides one example of the operation of a portion of the authorization service 115. The flowchart of FIG. 4 provides merely an example of the many different types of functional arrangements that can be employed to implement the operation of the depicted portion of the authorization service 115. As an alternative, the flowchart of FIG. 4 can be viewed as depicting an example of elements of a method implemented within the network environment 100.

Beginning with block 403, the authorization service 115 can receive a start session request from a client device 111. The start session request is made by the client device 111 when the client application 151 predicts that the client will make more than one purchases in quick succession. For example, an automobile may be configured to initiate a transaction for each mile or each hour a person is operating a vehicle. In another example, a person may be watching a live stream of their favorite gaming personality play a video game. In such a situation, the person may want to make multiple small tips or donations to the live streamer when the live streamer performs well. In another situation, a person may be downloading applications from an app store where the cost of each application is minimal, but the person is likely to purchase more than just one application.

In some embodiments at block 403, the authorization service 115 can also perform check on the funding source 133 to determine if the funding source 133 has enough anticipated funds to cover the interaction. For example, the request to start the session can include an estimated amount to pre-authorize with a funding source 133. The authorization service 115 can obtain a balance or credit amount associated with the funding source 133 to determine whether the established amount could be paid using the funding source. In at least one embodiment, when a funding source 133 does not have the requisite balance or credit amount available in a funding source 133, the authorization service 115 can end the process.

In some embodiments at block 403, the authorization service 115 can also pre-fund or preauthorize a set of funds. The request to start the session can include an estimated amount to pre-fund or pre-authorize with a funding source 133. The authorization service 115 can debit the amount from the funding source 133. The amount pre-authorized or pre-funded can be used until the amount is exhausted or if the stream ends before the amount is used in its entirety.

Next, at block 406, the authorization service 115 can begin listening for payment events on an event stream. First, an event stream can be established between the client application 151 and the authorization service 115. The event stream can include any number of events captured by the client application 151 and sent to the authorization service 115 for analysis. At least one type of event that can be sent on the event stream is a payment event. At block 406, the authorization service 115 is configured to listen for any such payment event that occurs on the event stream.

Next, at block 409, the authorization service 115 can identify a payment event. Specifically, the authorization service 115 can identify a payment event that was sent from the client application 151. The authorization service 115 can identify the source of the payment event by comparing a device identifier 136 with information sent in the payment event. In at least some embodiments, other data can be used to identify a source of the payment event.

Next, at block 412, the authorization service 115 can debit the payor funding source 133, thereby causing an amount of a currency denomination to be taken from the payor funding source 133. For example, if the payor funding source 133 is funded with US dollars and the transaction amount is in US dollars, the transaction amount in US dollars will be deducted from the payor funding source 133. In many embodiments, the authorization service 115 can debit the payor funding source 133 by the total transaction amount. In some embodiments, the authorization service 115 can look up an exchange rate between the currency denomination of the transaction and the currency denomination of the payor funding source 133. Such an exchange rate can be used to calculate the amount to be debited from the payor funding source 133. In some embodiments, the authorization service 115 will debit the payor funding source 133 in response to transmitting the CBDC transfer to a CBDC network 109, as later described in block 421.

Next, at block 415, the authorization service 115 can credit the payor CBDC wallet. A CBDC wallet is another funding source 133 for a user profile 121. By crediting, an amount of a currency denomination will be added to the payor CBDC wallet. In many embodiments, the amount added to the CBDC wallet will correspond to the total transaction amount. In some embodiments, the authorization service 115 can look up an exchange rate between the currency denomination of the total transaction amount and the CBDC. Such an exchange rate can be used to calculate the amount to be credited to the payor CBDC wallet. In at least one embodiment, a user profile 121 for the payor may not have a funding source 133 that can be a payor CBDC wallet. In such a situation, the provider of the authorization service 115 can utilize a provider CBDC wallet address 127 in lieu of a CBDC wallet.

Next, at block 418, the authorization service 115 can generate a CBDC transfer corresponding to the payee wallet address. In some embodiments, a CBDC transfer can represent a line that could be added to a ledger in a larger system, such as a CBDC network 109. The CBDCs can be implemented on a blockchain or a distributed data store. Therefore, in at least some embodiments, the CBDC transfer can be a CBDC blockchain transfer and the CBDC transfer is formatted according to a specified blockchain standard. In some embodiments, the authorization service 115 can use a private key based at least in part on an authorization for the payment token 130 to be used as a blockchain address. In some embodiments, a CBDC transfer can comprise a digital signature.

Next, at block 421, the authorization service 115 can transmit the CBDC transfer for the purchase to a CBDC network 109. In at least one embodiment, transmitting a CBDC transfer can include sending a request to service that is hosted on a CBDC network 109. In an embodiment where the CBDC transfer is a CBDC blockchain transfer, the CBDC blockchain transfer can be written to the blockchain or distributed datastore of the CBDC network 109.

Next, at block 424, the authorization service 115 can determine whether it has received a request to cease listening to the event stream. If the authorization service 115 has received a request to cease listening to the event stream, then the process continues to block 427. However, if the authorization service 115 has not received a request to cease listening to the event stream, then the process returns to block 406 to continue listening for a payment event on an event stream.

Next, at block 427, the authorization service 115 can cease listening to the event stream. In such a situation, the authorization service 115 will stop identifying when payment events are sent from the client application 151 to the authorization service 115. In at least some embodiments, the event stream connection can also be broken such that the client application 151 also stops sending events to the authorization service 115 for any purpose. Once the authorization service 115 has ceased listening on the event stream, the flowchart of FIG. 4 ends. In at least another embodiment, once the authorization service 115 has ceased listening on the event stream, the flowchart of FIG. 2 continues to block 503 of FIG. 5.

Referring next to FIG. 4, shown is a flowchart that provides one example of the operation of a portion of the authorization service 115. The flowchart of FIG. 4 provides merely an example of the many different types of functional arrangements that can be employed to implement the operation of the depicted portion of the authorization service 115. As an alternative, the flowchart of FIG. 4 can be viewed as depicting an example of elements of a method implemented within the network environment 100.

Beginning with block 503, the authorization service 115 can verify a transaction with the CBDC network 503. In at least one embodiment, the CBDC network 503 can send a confirmation of the transaction in response to receiving the transmitted transaction of block 218, block 330, or block 421. In such an embodiment, the response from the CBDC network can include a message and/or a response code that indicates the status of the transaction. In at least another embodiment, the authorization service 115 can send a query to the CBDC network 503 to determine whether the transaction has been completed. In at least one embodiment, the authorization service 115 can directly query the CBDC network 503 about a specific transaction. In at least one embodiment, the authorization service 115 can direct the client device 111 to query the CBDC network 109 and request a return of the response. In at least one embodiment, the authorization service 115 can direct the merchant system to query the CBDC network 109 and request a return of the response. In some embodiments, the transaction batch processing can be non-instantaneous (e.g., a block is written to a CBDC blockchain every ten minutes) and verification can be difficult to determine. In such an embodiment, the authorization service 115 can front the funds to the payee on behalf of the payor to ensure that instantaneous commerce can be performed as expected.

Next, at block 506, the authorization service 115 can determine if the transaction is valid. In at least one embodiment, the authorization service 115 can determine if the transaction is valid by inspecting a response code and/or a response message received during the verification of block 503. A response code can include numbers, letters, or characters which uniquely identify a specific type of response. For example, a response code of "404" could be used to identify that a destination wallet address is not found. In at least some embodiments, the response codes could correspond to credit card issuer response codes. For instance, "00" could correspond to "Issuer system unavailable;" "01" could correspond to "refer to issuer;" "05" could correspond to "do not honor;" "12" could correspond to "invalid transaction;" "65" could correspond to "activity limit exceeded;" and other various transaction codes used by card issuers. These response codes can correspond to common transaction responses, like transaction completed, transaction pending, insufficient funds in the source account, the destination is not found, funds were not able to be drawn from the source account, limits have been reached, etc. Based on the response code and/or response message, the authorization service 115 can decide whether the transaction was completed and successful or if the transaction failed in any way. If the transaction was completed, the flowchart of FIG. 5 ends. If the transaction failed in any way, the process can continue to block 509.

At block 509, the authorization service 115 can perform a remedial action. In at least some embodiments, the authorization service 115 can attempt to retry the CBDC transfer as a remedial action. In at least one embodiment, retrying the CBDC transfer could include performing the steps of block 218, block 330, or block 421, as previously discussed. In at least another embodiment, the authorization service 115 can modify the generated CBDC transfer, before it is sent to the CBDC network 109, to include or modify a value to indicate that this request is a unique CBDC transfer. When the authorization service 115 attempts to perform the CBDC transfer again, the process can return to block 503 to verify the transaction with the CBDC network 109.

In at least another embodiment, the authorization service 115 can send a message to the client device 111 as a remedial action. In at least one embodiment, the message sent to the client device 111 can include a request to fix an issue with the transaction. In at least another embodiment, the message sent to the client device 111 can be used to notify the client device 111 that the CBDC transfer has failed. In at least another embodiment, the message can include content indicating that the CBDC network 109 is not available and another payment method is required.

In at least another embodiment, the authorization service 115 can send a message to the POS device 144 as a remedial action. In at least one embodiment, the message sent to the POS device 144 can include a request to fix an issue with the transaction. In at least another embodiment, the message sent to the POS device 144 can be used to notify the POS device 144 that the CBDC transfer has failed. In at least another embodiment, the message can include content indicating that the CBDC network 109 is not available and another payment method is required.

In at least another embodiment, the authorization service 115 can identify that CBDC network 109 is failing to respond or rejecting a plurality of CBDC transfers for a period of time and determine that the CBDC network 109 is experiencing a failure. In such an embodiment, the authorization service 115 can send a message to the client device 111 as a remedial action to warn that the CBDC network 109 is experiencing a failure scenario. In such a situation, if the authorization service 115 includes preferences 139 for the payee to receive funds at a secondary account, the authorization service 115 can re-route the CBDC transfer to a secondary funding source. In another embodiment, the authorization service 115 can direct the client device 111 to cease any future microtransactions being requested, which may limit the experience of the end-user.

In another embodiment, the authorization service 115 can initiate a refund of the CBDC transfer as a remedial action. In at least some examples, microtransactions can be utilized for more consumable items or consumable services for which returns on the CBDC transfer are not common. However, some embodiments of microtransactions could be more conducive to having a returns process. For instance, in an example where a digital movie streaming company charges a small fee (pennies, nickles, dimes, etc.) for each period of time (minute, 5 minutes, 10 minutes, etc.) of the content that is watched, if the digital movie streaming company's servers failed at any point during the streaming of the movie, then the total experience will have been destroyed for the consumer. In such a situation, a refund process can be recognized by the authorization service 115 and be further executed according to various procedures. Once the authorization service 115 has performed the remedial action, the flowchart of FIG. 5 ends.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), quantum random access memory (QRAM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same network environment 100.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and machine-readable instructions stored in the memory that, when executed by the processor, cause the computing device to at least:

receive an authorization request for a purchase, the authorization request comprising a total transaction amount;

determine that the purchase qualifies as a microtransaction based at least in part on a comparison between the total transaction amount and a predefined threshold, wherein the total transaction amount is lower than the threshold;

identify a payment token associated with the authorization request;

obtain a plurality of payee wallet addresses;

receive a transaction amount for each of the plurality of payee wallet addresses, such that a sum of the transaction amounts for the plurality of payee wallet addresses is equal to the total transaction amount;

generate a central bank digital currency (CBDC) blockchain transfer for each of the plurality of payee wallet addresses using a private key based at least in part on an authorization for the payment token to use a blockchain address, each CBDC blockchain transfer comprising a digital signature; and transmit each of the CBDC blockchain transfers for the purchase to a CBDC blockchain network.

2. The system of claim 1, wherein the purchase represents an exchange of currency for an item having a stock keeping unit (SKU) and wherein the machine-readable instructions that obtain the plurality of payee wallet addresses further cause the computing device to at least search a data store for the plurality of payee wallet addresses based on the SKU.

3. The system of claim 1, wherein the machine-readable instructions that obtain the plurality of payee wallet addresses further cause the computing device to at least receive the plurality of payee wallet addresses from a point-of-sale device of a merchant system.

4. The system of claim 1, wherein at least one of the plurality of payee wallet addresses is a wallet address for a government entity and a corresponding transaction amount represents taxes for the purchase.

5. The system of claim 1, wherein the total transaction amount is representative of an amount in a first CBDC, each CBDC blockchain transfer is from a first funding source having a payor wallet address, and the machine-readable instructions further cause the computing device to at least convert an equivalent amount of the total transaction amount to the first CBDC in a first funding source from a second CBDC in a second funding source.

6. The system of claim 1, wherein each CBDC blockchain transfer is from a first funding source having a payor wallet address and the machine-readable instructions further cause the computing device to at least convert an equivalent amount of the total transaction amount to the CBDC in a first funding source from a non-digital currency in a second funding source.

7. The system of claim 1, wherein the plurality of payee wallet addresses correspond to a plurality of supply stakeholders that contributed to a supply chain of the purchase and each transaction amount corresponds to an amount allocated for a supply stakeholder.

8. A method, comprising:

receiving, from a client device, an authorization request for a purchase, wherein the authorization request indicates that a total transaction amount is to be paid from a payor funding source to a payee funding source, and both the payor funding source and payee funding source are funded using at least one non-digital currency;

determining that the purchase qualifies as a microtransaction based at least in part by comparing the total transaction amount to a predefined threshold amount, wherein the total transaction amount is lower than the threshold amount;

determining that the payee funding source accepts transactions in a central bank digital currency (CBDC);

obtaining, in response to determining that the payee funding source accepts the transactions in the CBDC, a payee wallet address;

debiting the total transaction amount from the payor funding source;

crediting an amount equivalent to the total transaction amount in the CBDC to a payor wallet, the payor wallet being identifiable by a payor wallet address;

generating a CBDC transfer from the payor wallet address to the payee wallet address; and transmitting the CBDC transfer for the purchase to a CBDC network.

9. The method of claim 8, further comprising:

sending, before debiting the total transaction amount from the payor funding source, a notification to the client device, wherein the notification indicates that a transaction for the total transaction amount will occur; and receiving, after sending the notification and before debiting the total transaction amount from the payor funding source, an indication from the client device to proceed.

10. The method of claim 8, wherein determining that the payee funding source accepts the transactions in the CBDC comprises:

sending a payment inquiry request to a payee funding source issuer for acceptable payment types; and receiving a response to the payment inquiry request indicating that the CBDC is an acceptable payment type.

11. The method of claim 8, wherein obtaining the payee wallet address comprises:

sending a wallet address request to a payee funding source issuer, wherein the wallet address request includes a payment type of the CBDC and an identifier associated with the payee funding source; and receiving a response to the wallet address request comprising the payee wallet address.

12. The method of claim 11, wherein the payee wallet address is associated with a plurality of funding sources controlled by the payee funding source issuer.

13. The method of claim 8, wherein the CBDC network is a CBDC blockchain network and transmitting the CBDC transfer for the purchase to the CBDC blockchain network further comprises writing the CBDC transfer to a block on the CBDC blockchain network.

14. The method of claim 8, wherein debiting the total transaction amount from the payor funding source occurs in response to transmitting the CBDC transfer for the purchase to the CBDC network.

15. A non-transitory, computer-readable medium comprising machine-readable instructions that, when executed by a processor of a computing device, cause the computing device to at least:

receive an authorization request for a purchase, the authorization request comprising a total transaction amount;

determine that the purchase qualifies as a microtransaction based at least in part on a comparison between the total transaction amount and a predefined threshold, wherein the total transaction amount is lower than the threshold;

identify a payment token associated with the authorization request;

obtain a plurality of payee wallet addresses;

receive a transaction amount for each of the plurality of payee wallet addresses, such that a sum of the transaction amounts for the plurality of payee wallet addresses is equal to the total transaction amount;

generate a central bank digital currency (CBDC) blockchain transfer for each of the plurality of payee wallet addresses using a private key based at least in part on an authorization for the payment token to use a blockchain address, each CBDC blockchain transfer comprising a digital signature; and transmit each of the CBDC blockchain transfers for the purchase to a CBDC blockchain network.

16. The non-transitory, computer-readable medium of claim 15, wherein the purchase represents an exchange of currency for an item having a stock keeping unit (SKU) and wherein the machine-readable instructions that obtain the plurality of payee wallet addresses further cause the computing device to at least search a data store for the plurality of payee wallet addresses based on the SKU.

17. The non-transitory, computer-readable medium of claim 15, wherein the machine-readable instructions that obtain the plurality of payee wallet addresses further cause the computing device to at least receive the plurality of payee wallet addresses from a point-of-sale device of a merchant system.

18. The non-transitory, computer-readable medium of claim 15, wherein at least one of the plurality of payee wallet addresses is a wallet address for a government entity and a corresponding transaction amount represents taxes for the purchase.

19. The non-transitory, computer-readable medium of claim 15, wherein the total transaction amount is representative of an amount in a first CBDC, each CBDC blockchain transfer is from a first funding source having a payor wallet address, and the machine-readable instructions further cause the computing device to at least convert an equivalent amount of the total transaction amount to the first CBDC in a first funding source from a second CBDC in a second funding source.

20. The non-transitory, computer-readable medium of claim 15, wherein each CBDC blockchain transfer is from a first funding source having a payor wallet address and the machine-readable instructions further cause the computing device to at least convert an equivalent amount of the total transaction amount to the CBDC in a first funding source from a non-digital currency in a second funding source.

* * * * *